(12) United States Patent
Dias et al.

(10) Patent No.: US 8,024,301 B2
(45) Date of Patent: *Sep. 20, 2011

(54) AUTOMATIC DATABASE DIAGNOSTIC USAGE MODELS

(75) Inventors: Karl Dias, Foster City, CA (US);
Graham S. Wood, El Granada, CA (US); Shivani Gupta, Los Altos, CA (US); Sushil Kumar, San Jose, CA (US); Mark Ramacher, San Carlos, CA (US); Uri Shaft, Castro Valley, CA (US); Leng Leng Tan, Sunnyvale, CA (US); Venkateshwaran Venkataramani, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 10/916,695

(22) Filed: Aug. 11, 2004

(65) Prior Publication Data

US 2005/0216490 A1 Sep. 29, 2005

Related U.S. Application Data

(60) Provisional application No. 60/556,939, filed on Mar. 26, 2004.

(51) Int. Cl.
*G06F 7/00* (2006.01)
(52) U.S. Cl. ........................................ 707/688; 707/792
(58) Field of Classification Search .................. 707/200
See application file for complete search history.

(56) References Cited

U.S. PATENT DOCUMENTS

| | | | |
|---|---|---|---|
| 2,883,255 A | 4/1959 | Anderson | |
| 3,324,458 A | 6/1967 | Macarthur | |
| 3,344,408 A | 9/1967 | Singer et al. | |
| 3,351,910 A | 11/1967 | Miller et al. | |
| 4,654,806 A | 3/1987 | Poyser et al. | |
| 4,849,879 A * | 7/1989 | Chinnaswamy et al. | 706/45 |
| 4,994,986 A | 2/1991 | Cihiwsky et al. | |
| 5,349,662 A | 9/1994 | Johnson et al. | |
| 5,488,648 A | 1/1996 | Womble | |
| 5,729,736 A | 3/1998 | Gomi et al. | |

(Continued)

FOREIGN PATENT DOCUMENTS

JP 55-91036 A 7/1980

(Continued)

OTHER PUBLICATIONS

Hankins, Richard er al., Scaling and Characterizing Database Workloads: Bridging the Gap between Research and PRactice, Proceedings of 36th Annual IEEE/ACM Intern'l Symp. on Microarchitecture (2003).*

(Continued)

*Primary Examiner* — Christyann R Pulliam
(74) *Attorney, Agent, or Firm* — Kilpatrick Townsend & Stockton LLP

(57) ABSTRACT

One or more usage models are provided for a database. Each usage model includes a set of rules that are used to analyze database performance. A usage model in one or more usage models is determined. Database information is determined based on the usage model. The database information is then analyzed based on rules associated with the usage model. One or more performance problems are determined based on the analysis.

25 Claims, 5 Drawing Sheets

U.S. PATENT DOCUMENTS

| | | | |
|---|---|---|---|
| 5,781,703 A | | 7/1998 | Desai et al. |
| 5,872,976 A | | 2/1999 | Yee et al. |
| 5,905,987 A | * | 5/1999 | Shutt et al. .................... 717/108 |
| 6,029,163 A | * | 2/2000 | Ziauddin .......................... 707/2 |
| 6,035,306 A | * | 3/2000 | Lowenthal et al. ........... 707/200 |
| 6,052,694 A | * | 4/2000 | Bromberg ........................ 707/2 |
| 6,311,175 B1 | | 10/2001 | Adriaans et al. |
| 6,564,174 B1 | * | 5/2003 | Ding et al. .................... 702/186 |
| 6,615,222 B2 | * | 9/2003 | Hornibrook et al. .......... 707/200 |
| 6,738,933 B2 | * | 5/2004 | Fraenkel et al. ............. 714/47.2 |
| 6,804,627 B1 | * | 10/2004 | Marokhovsky et al. ...... 702/182 |
| 6,898,556 B2 | * | 5/2005 | Smocha et al. ............... 702/186 |
| 6,954,717 B2 | | 10/2005 | Boldt et al. |
| 6,955,302 B2 | | 10/2005 | Erdman, Jr. |
| 7,007,039 B2 | * | 2/2006 | Chaudhuri et al. ........... 707/200 |
| 7,051,013 B2 | * | 5/2006 | Horman et al. .................... 707/2 |
| 7,085,786 B2 | | 8/2006 | Carlson et al. |
| 7,089,347 B2 | | 8/2006 | Mogi et al. |
| 7,136,850 B2 | * | 11/2006 | Keller et al. ...................... 707/4 |
| 7,139,749 B2 | * | 11/2006 | Bossman et al. ................... 707/3 |
| 7,146,357 B2 | * | 12/2006 | Suzuki et al. ................ 707/688 |
| 7,194,451 B2 | * | 3/2007 | Chaudhuri et al. ................ 707/2 |
| 7,366,740 B2 | * | 4/2008 | Sleeman et al. .............. 707/202 |
| 2002/0065833 A1 | * | 5/2002 | Litvin ............................ 707/200 |
| 2002/0087587 A1 | * | 7/2002 | Vos et al. ....................... 707/203 |
| 2002/0198985 A1 | * | 12/2002 | Fraenkel et al. .............. 709/224 |
| 2004/0044500 A1 | | 3/2004 | Lu |
| 2004/0044700 A1 | | 3/2004 | Fisher et al. |
| 2005/0103874 A1 | | 5/2005 | Erdman, Jr. |
| 2005/0278381 A1 | | 12/2005 | Diao et al. |
| 2006/0167704 A1 | * | 7/2006 | Nicholls et al. ................... 705/1 |
| 2007/0022192 A1 | | 1/2007 | Nguyen et al. |

FOREIGN PATENT DOCUMENTS

| | | |
|---|---|---|
| JP | 02-232795 A | 9/1990 |
| WO | WO 02/06949 A2 | 1/2002 |
| WO | WO 02/37061 A1 | 5/2002 |

OTHER PUBLICATIONS

Manasce, Daniel et al., Preserving QoS of e-Commerce sites through self-tuning: a performance model approach, EC'01, Proceedings of the 3rd ACM conf. on Electronic Commerce (2001).*

Diao, Y. et al., Managing Web server performance with AutoTune agents, IBM Systems Journal vol. 42, issue 1, pp. 136-149 (2003).*

G. Wood and K. Hailey. The self-managing database: Automatic performance diagnosis. Technical report, Oracle Corporation, Nov. 2003.*

Doppelhammer et al., "Database Performance in the Real World: TPC-D and SAP R/3," 1997, ACM, p. 123-134.

Hagmann et al., "Performance Analysis of Several Back-End Database Architectures," 1986, ACM, p. 1-26.

IBM Technical Disclosure Bulletin, "Software Monitor for Performance Tuning a Virtual Memory Computer System", May 1, 1973, Vol. No. 15, Issue No. 12, pp. 3730-3733.

Ryu et al., "Analysis of Database Performance with Dynamic Locking," '1990, ACM, p. 491-523.

Stonebraker et al., "Performance Enhancements to a Relational Database System," 1983, ACM, p. 167-185.

* cited by examiner

AUTOMATIC DATABASE DIAGNOSTIC USAGE MODELS

CROSS-REFERENCES TO RELATED APPLICATIONS

This application claims priority from U.S. Provisional Patent Application No. 60/556,939, filed Mar. 26, 2004 entitled "AUTOMATIC DATABASE DIAGNOSTIC USAGE MODELS", which is hereby incorporated by reference, as if set forth in full in this document, for all purposes.

This application is also related to the following applications, which are all incorporated by reference for all purposes:

U.S. application Ser. No. 10/775,531, entitled "Automatic Database Diagnostic Monitor Architecture", filed Feb. 9, 2004, which issued as U.S. Pat. No. 7,673,291 on Mar. 2, 2010; and U.S. application Ser. No. 10/775,733, entitled "Capturing Session Activity As In-Memory Snapshots Using a Time-Based Sampling Technique Within a Database For Performance Tuning and Problem Diagnosis", filed Feb. 9, 2004, which issued as U.S. Pat. No. 7,292,961 on Nov. 6, 2007.

BACKGROUND OF THE INVENTION

The present invention generally relates to databases and more specifically to apparatus and methods for providing usage models for diagnosing performance problems in a database.

Enterprise databases continue to grow in size and number resulting in increased system management and administrative complexity. As the size and complexity of database systems increase, the likelihood that performance problems may result also increases. Analysis of the problems thus becomes an important task to properly maintain database systems.

Diagnosing performance problems in a database is a very involved task that makes use of a variety of different metrics and statistics. A database administrator (DBA) needs a great deal of expertise to interpret the statistics and arrive at a reasonable solution. Often, a DBA is alerted of a problem and then works with raw statistics to determine a cause of the problem. A DBA is left with a wealth of raw statistics that the DBA must analyze to determine any performance problems. The type of analysis performed is subjective in that the DBA may subjectively choose statistics to review that the DBA thinks may lead to determining a cause of a performance problem. The raw statistics presented to a DBA are often enormous and require extensive knowledge on the part of a DBA to analyze for problems, if at all possible. Also, even if problems are determined from the statistics, the problems found are often determined based on the subjective analysis performed by the DBA. Thus, the review of statistics may differ between different DBAs.

Moreover, when working proactively to identify problems with different time frames and in different situations, additional complexity and detail are added to the diagnosis of performance problems. It may be harder to find problems rather than solve problems that have been reported. A DBA may not be aware of the time period or statistics that need to be reviewed to determine any performance problems. For example, the type of analysis needed to be performed when a system is delayed, such as when a system's performance has been degraded or is hung, versus what is needed when optimizing the workload of a database as a whole is entirely different. A DBA may not perform the preferred analysis for the situation. Also, the type of analysis that is performed may differ depending on the DBA performing the analysis.

Accordingly, improved methods for diagnosing performance problems are desired.

BRIEF SUMMARY OF THE INVENTION

The present invention generally relates to providing one or more usage models for use in analyzing database performance. In one embodiment, one or more usage models are provided for a database. Each usage model includes a set of rules that are used to analyze database performance. A usage model in one or more usage models is determined. Database information is determined based on the usage model. The database information is then analyzed based on rules associated with the usage model. One or more performance problems are determined based on the analysis.

In one embodiment, a method for analyzing performance problems in a database is provided. The method comprises: providing one or more usage models for a database, each usage model in the one or more usage models including a set of rules that are used to analyze database performance; determining a usage model in the one or more usage models to use; determining database information to analyze based on the usage model; and analyzing the database information based on rules associated with the usage model to detect one or more performance problems based on the analysis.

In another embodiment, a method for analyzing performance problems in a database is provided. The method comprises: providing a plurality of usage models for a database, each usage model in the plurality of usage models including a set of rules that are used to analyze different areas of database performance; determining an area of database performance to analyze; determining a usage model in the plurality usage models to use based on an the area of database performance determined and the area of database performance associated with the set of rules for the usage model; determining database information to analyze based on the usage model and the area of database performance associated with the usage model; and analyzing the database information based on rules associated with the usage model to detect one or more performance problems based on the analysis.

Embodiments of the present invention are embodied in a computer program product stored on a computer-readable medium.

A further understanding of the nature and the advantages of the inventions disclosed herein may be realized by reference of the remaining portions of the specification and the attached drawings.

DETAILED DESCRIPTION OF THE INVENTION

Figure 1:
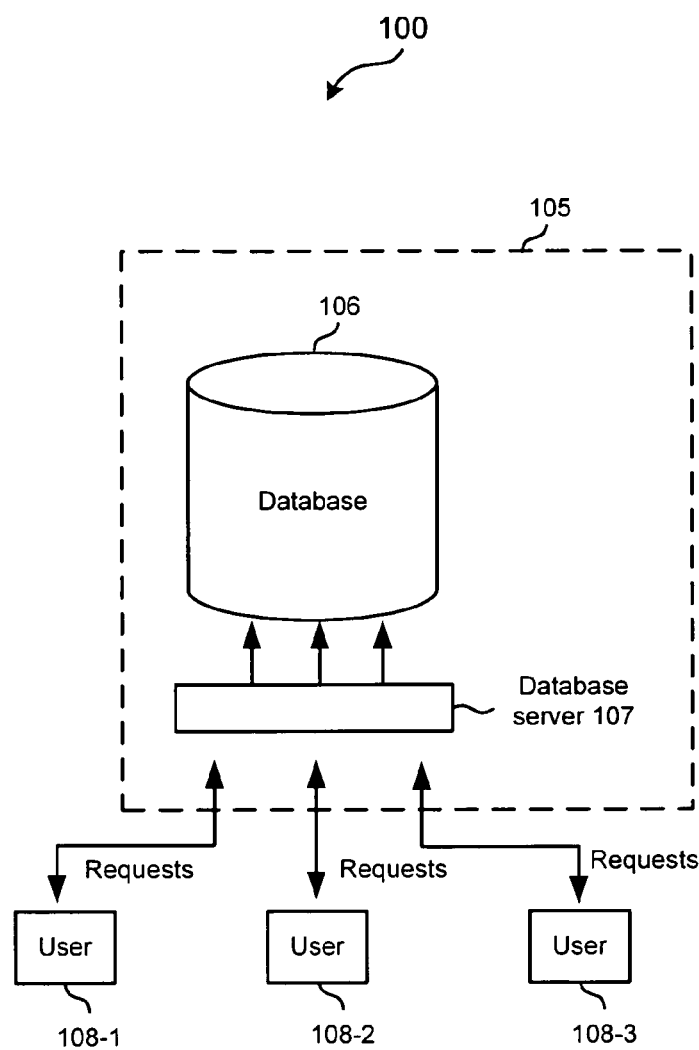
FIG. 1 depicts a system for diagnosing performance problems in a database system according to one embodiment of the present invention.
Figure 6:
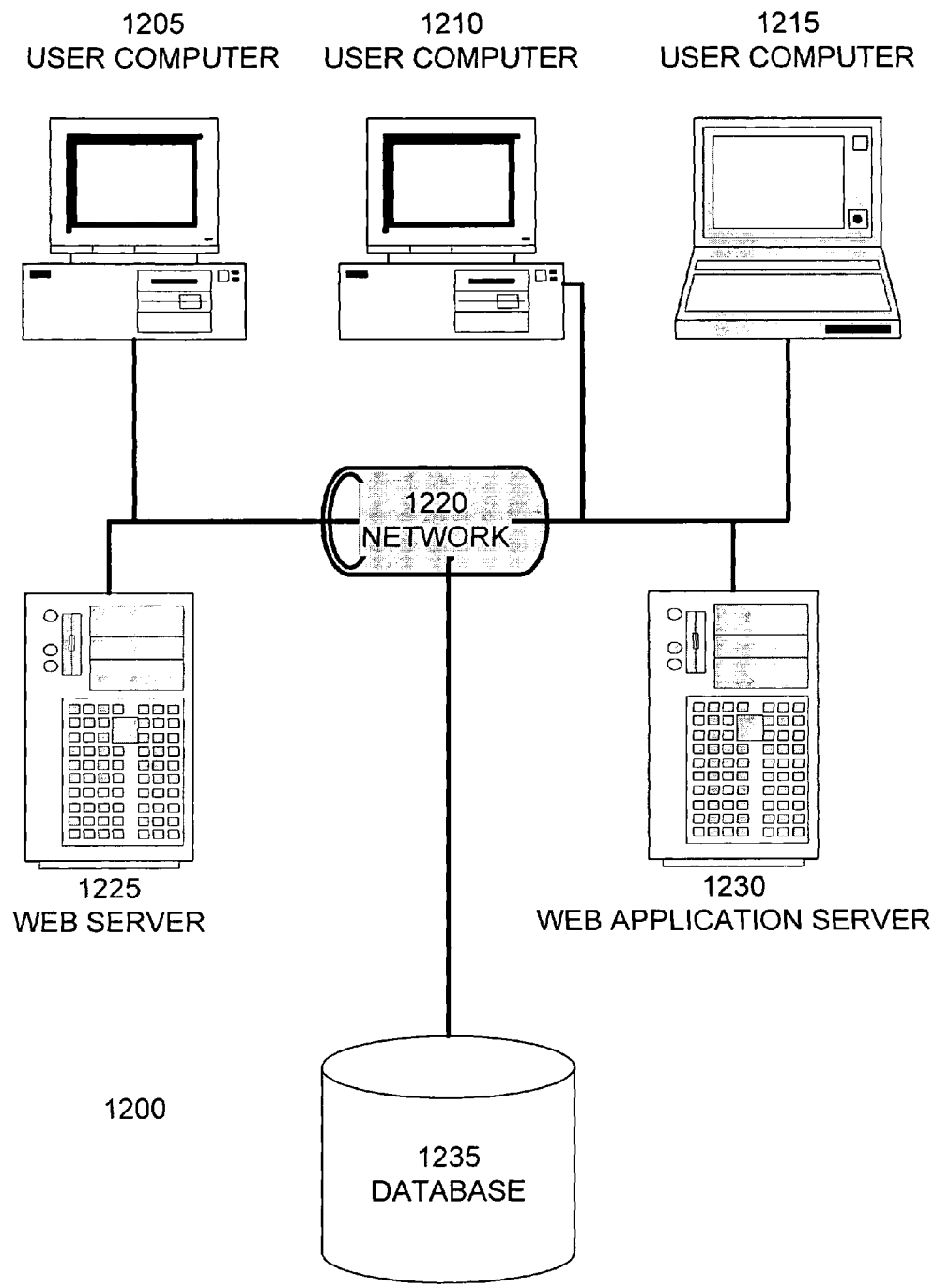
FIG. 6 is a block diagram of a database system for implementing an embodiment of the invention.

FIG. 1 depicts a system 100 for diagnosing performance problems in a database system according to one embodiment of the present invention. System 100 includes a client (not shown), an automatic database diagnostic monitor (ADDM) (not shown), a database system 105, and one or more users 108. In one embodiment, database system 105 includes a database 106 and database server 107. Database server 107 is configured to receive and process requests for database 106. Database 105 may be any database system and a person skilled in the art will appreciate other components and variations to database system 105. Also, FIG. 6 provides a general description of a database system.

Users 108 send requests for operations to be performed in database 106. The operations include reading data in database 106, writing data to database 106, updating data in database 106, etc. For example, requests include SQL statements that cause operations to be performed in database 106. Interaction of the users 108 with database 106 using requests is known in the art and a person skilled in the art will appreciate how database systems may be used. In one embodiment, an automatic database diagnostic monitor (ADDM) may used to diagnose performance problems in database system 105. ADDM is described in more detail in the U.S. application Ser. No. 10/775,531, entitled "Automatic Database Diagnostic Monitor Architecture,", filed Feb. 9, 2004, which is hereby incorporated by reference for all purposes.

In one embodiment, usage models are provided and used by ADDM to evaluate performance problems in database 105. For example, a period analysis usage model, spot analysis usage model, and period comparison usage model are provided. Although these usage models are described, it will be recognized that other usage models may be contemplated.

The period analysis usage model analyzes database information over a period of time. A throughput analysis is performed with a goal of reducing the amount of resources consumed for a given workload. Throughput, for example, is how much work is being done in database system 105. Thus, how much work being done is analyzed over a certain time period. The throughput analyses may be performed using information for database system 105. For example, I/O bandwidth that is constrained, bottlenecks in different areas of database system 105, contention or database locks on a resource, etc. may be analyzed.

The diagnosis for performance problems in the period analysis usage model may use snapshots of database information that are captured. Each snapshot includes information that is captured at a certain time. Multiple snapshots over a period of time can be used to determine database performance over that time. Snapshots are described in more detail in U.S. patent Ser. No. 10/775,733, entitled "Capturing Session Activity As In-Memory Snapshots Using a Time-Based Sampling Technique Within a Database For Performance Tuning and Problem Diagnosis", filed Feb. 9, 2004, which is hereby incorporated by reference for all purposes. Although analyzing snapshots of database information is described, it will be understood that other information may be analyzed, such as a continuous stream of statistics.

In one embodiment, when a snapshot is received, the period that is used in the analysis is the two most recent snapshots. In other embodiments, a different number of snapshots may be used. ADDM analyzes the snapshots to determine any performance problems based on information in the snapshots.

A set of rules may be associated with the period analysis usage model. The rules may specify certain problems that are analyzed specifically by the period analysis usage model. Certain information is gleaned from the snapshots and, depending on the information, certain performance problems may be determined. In one embodiment, the performance problems that the period analysis usage model focuses on relate to the throughput of database system 105. For example, problems relating to the number of resources that are consumed during the period are analyzed. The period analysis usage model looks at reducing time spent on operations being performed in database system 105.

In one embodiment, the period analysis is run automatically. In this case, a DBA can be alerted to possible issues in database system 105 before they become more serious. Thus, the period analysis usage model may be used to maintain performance in database system 105. Also, it will be recognized that a period analysis may be invoked manually for a specific analysis. This may occur when a DBA wants to analyze a certain time period.

The spot analysis usage model analyzes database system 105 for a very short period of time (e.g., one minute, three minutes, etc.). In one embodiment, the spot analysis usage model is directed towards analyzing response time. For example, there may be a problem where there is a sharp spike in the response time of database system 105, possibly due to an increased load or a potential hang/deadlock. The response time may be how much time database system 105 takes to respond to and process an operation. The spot analysis usage model is focused on determining what caused the brief spike in response time.

In one embodiment, the spot analysis usage model analyzes a particular dimension in database system 105. The dimension is a subset of database information. The spot analysis may not look at the database as a whole, such as may be done with the period analysis usage model. A dimension may be, for example, a user. The spot analysis may determine why a particular user is being affected by slow response times.

The spot analysis usage model may be invoked by a DBA or automatically invoked by ADDM. For example, ADDM may detect when a performance problem, such as the brief spike in activity, and invoke the spot analysis. Also, a DBA may recognize a performance problem and invoke the spot analysis in order to analyze database activity at that time. The DBA may specify a time in the past in which case the analysis may be done using statistics captured, such as snapshots. Also, the analysis may be done live while database system 105 is running, using the present performance data of database system 105.

A set of rules may be associated with the spot analysis usage model. The rules may specify certain problems that are analyzed by the spot analysis usage model. Certain information is determined for the possible problems and, depending on the information, certain performance problems may be determined. In one embodiment, the performance problems that the spot analysis usage model focus on are related to the response time of database system 105. For example, problems may relate to the slow response time during the period. Accordingly, the spot analysis usage model looks at reducing time spent in response to operations requested in database system 105.

The period comparison analysis usage model is directed towards the comparison of characteristics of database information over two or more time periods. The comparison may be used to identify changes in workload over time or between similar systems.

For example, the changes may occur due to many reasons, such as an increased number of users, changes in application code, changes in underlying database system 105 itself, or changes to the database version. For example, an upgrade from one database version to another may cause changes in database performance. Thus, a period comparison analysis between two periods (one period for each version) may be performed to determine how the database is performing differently and what has changed between the versions.

Comparison over multiple periods may also be used for capacity planning. For example, the capacity planning may allow a DBA to predict future requirements on database system 105. For example, the comparison between base lines that are well established may be used. If the comparison with a base line period is similar, then a DBA may assume that database system 105 may perform similarly.

The comparison analysis usage model includes a set of rules that are used to analyze database information. The set of rules directed towards comparing different performance problems that may occur in database system 105. Database information that corresponds to the rules is determined and analyzed based on the rules. If a performance problem is detected based on the information, ADDM is configured to determine any performance problems based on the rules and the database information. For example, ADDM may determine that an SQL statement may be causing excess database time to be used in an upgraded version.

Accordingly, each of the usage models may be used in different situations and analyze different time periods. The usage models are also configured to analyze different sets of performance problems in database system 105. It will be recognized that the usage models may be used in different circumstances, but there may be overlap between the performance problems that are analyzed among usage models. Depending on the situation, a certain usage model may be more suited. For example, if a DBA detects slow response time at a certain time, the spot analysis usage model may be used. The spot analysis may then determine any possible performance problems that it is configured to detect. The information may then be used to analyze the slow response time problem.

Accordingly, models of how to analyze database information in certain situations are provided. Rules governing which problems are analyzed and how they are analyzed are used. Accordingly, a uniform analysis of database system 105 is provided by using the usage models.

Figure 2:
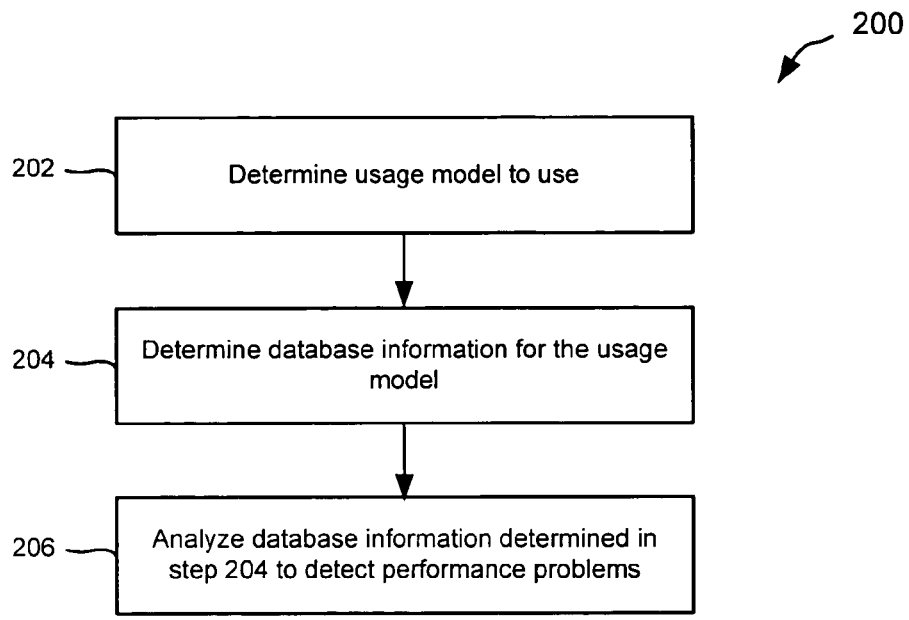
FIG. 2 depicts a simplified flowchart of a method for analyzing database performance according to one embodiment of the present invention.

FIG. 2 depicts a simplified flowchart 200 of a method for analyzing database performance according to one embodiment of the present invention. In step 202, a usage model to use is determined. The usage model may be determined based on certain analysis that is desired. For example, certain usage models may be more appropriate for analyzing different situations in database system 105.

The usage model may be selected in response to different factors. For example, one of the usage models described above may be automatically selected at certain times. For example, ADDM may detect certain patterns of database performance and automatically determine a usage model to run based on the performance information. Also, an input to run a usage model may also be received.

In step 204, database information is determined for the usage model. For example, each usage model may analyze different information. The information that is needed to analyze the performance problems associated with the usage model is thus determined. For example, a usage model may define a number of snapshots for a period of time.

In step 206, the database information determined in step 204 is analyzed to detect performance problems. For example, the usage model may be associated with a set of rules that define performance problems. The rules may be organized from symptoms to root causes. Thus, the database information is associated with certain rules and if it is determined a rule is satisfied, a possible performance problem may exist.

In one embodiment, the rules may be analyzed to determine if symptoms are satisfied that lead to a root cause. The performance problems may be any combination of symptoms and root causes. For example, a root cause may be determined when multiple symptoms are satisfied. If this is the case, the root cause may be determined as a performance problem along with the symptoms that lead to the root cause. Also, a symptom may not lead to a root cause but still may be considered a performance problem.

The performance problems may be outputted to a user or stored for future use. Also, ADDM may use the output to determine a solution to the problems found by the usage model.

Figure 3:
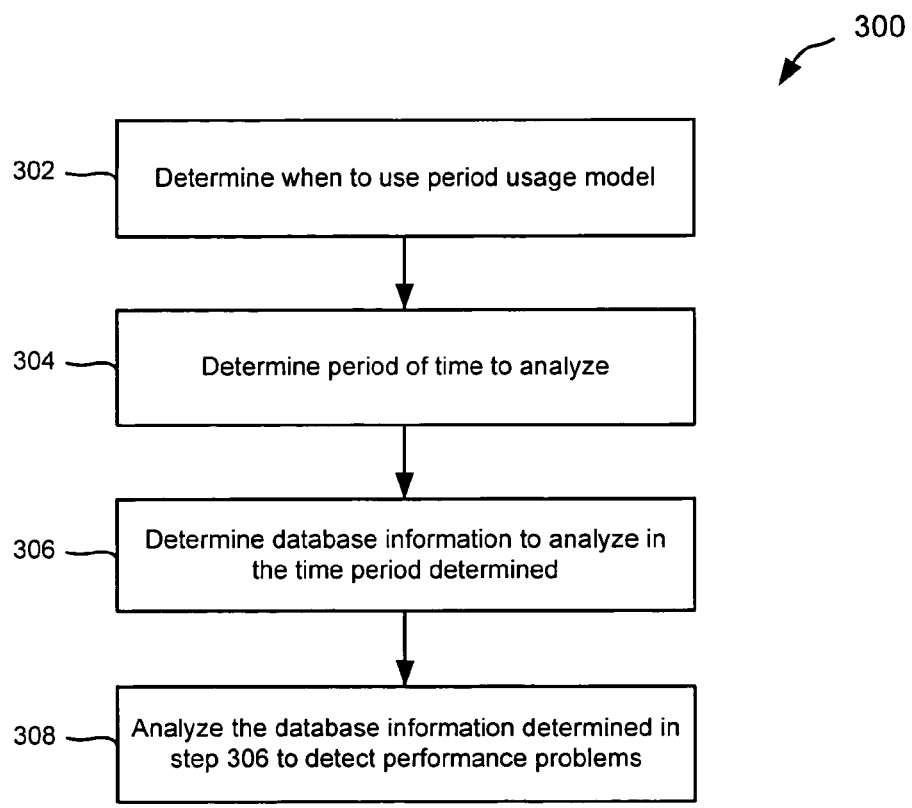
FIG. 3 depicts a simplified flowchart of a method for using the period analysis usage model.

FIG. 3 depicts a simplified flowchart 300 of a method for using the period analysis usage model. In step 302, it is determined when to use the period analysis usage model. The period analysis usage model may be run automatically. For example, when a new snapshot is received, the period analysis may be performed. Also, the analysis may be invoked manually by the DBA. Also, if certain events are detected in database system 105, the period analysis may be automatically invoked. For example, when throughput activity of database system 105 reaches a threshold, the period usage model may be selected.

In step 304, a period of time to analyze is determined. For example, the two most recent snapshots of database performance information may be analyzed. Also, the period of time may be larger or smaller than the two most recent snapshots.

In step 306, database information to analyze during the time period determined in step 304 is determined. For example, information needed for the period analysis usage model is determined from the two most recent snapshots. In one embodiment, rules associated with the usage model may require certain information in order to determine if they are satisfied. This information is determined and associated with the rules. For example, the period analysis usage model is directed towards analyzing throughput. Thus, any information about the amount of resources consumed is gleaned from the snapshots.

In step 308, the database information determined in step 306 is analyzed to detect performance problems. For example, the throughput or work being done by database system 105 is analyzed. For example, the usage model analyzes where time and resources are being spent within database system 105 over a time period. Some problems that may be determined are issues such as hitting memory limits, exceeding disk bandwidth, etc.

The information is analyzed according to the rules and performance problems are determined. For example, rules associated with the usage model are used to detect symptoms and root causes. If symptoms lead to root causes, a performance problem may be determined. Additionally, certain symptoms, if triggered, may also be determined as performance problems. In one embodiment, the performance problems that may be determined include problems that may be causing database system 105 to spend more time than necessary on certain operations.

Figure 4:
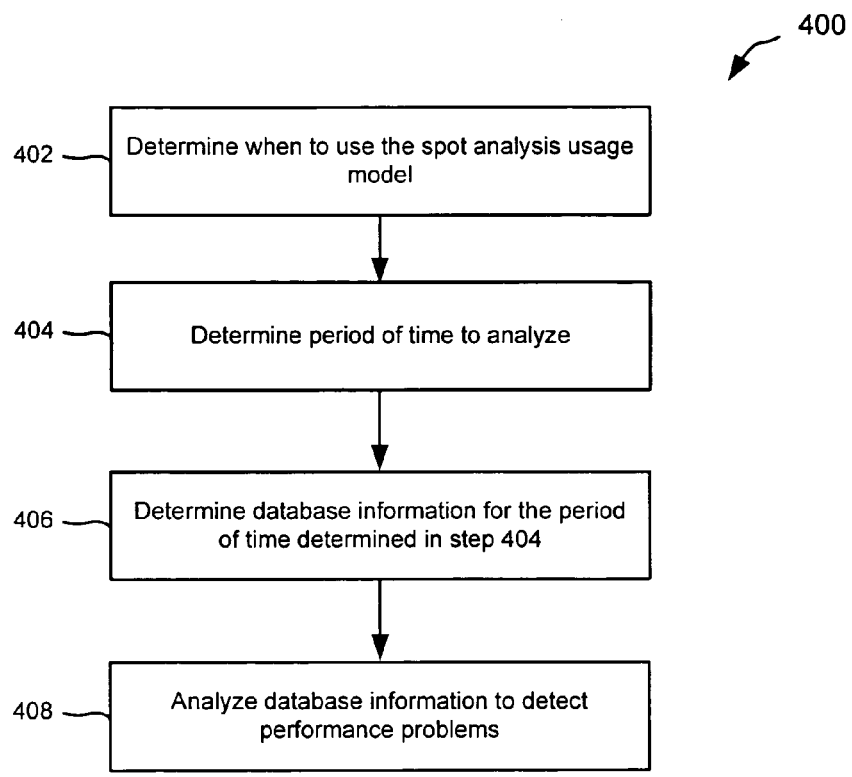
FIG. 4 depicts a simplified flowchart of a method for analyzing performance problems using a spot analysis usage model.

FIG. 4 depicts a simplified flowchart 400 of a method for analyzing performance problems using a spot analysis usage model. In step 402, it is determined when to use the spot analysis usage model. For example, the analysis may be run automatically when a certain event occurs. For example, when a sharp spike in response time is detected, the analysis may be run. Also, in another embodiment, the DBA may invoke the analysis.

In step 404, a period of time to analyze is determined. For example, the spot analysis usage model analyzes database activity for a short period of time (e.g., one minute, three minutes, etc.). In another embodiment, a certain point in time in the past may be received and a short time period around that time is determined. For example, a time window may be determined around a point in time. Also, the time may be the current time and live information is analyzed.

In step 406, database information for the time window is determined. In one embodiment, the database information determined is information that is needed by the spot analysis usage model. For example, the spot analysis usage model is concerned with response time analysis. Thus, any information related to response time for database 105 in the time period is determined. The information may be database statistics, active session history information, etc. This information may be information that is associated with certain rules for the usage model.

In step 408, the database information determined in step 406 for the spot analysis usage model is analyzed to detect performance problems. For example, a set of rules for the usage model is reviewed based on the database information determined in step 406. In one embodiment, the rules are analyzed to determine when symptoms lead to root causes.

For example, if the database information associated with the rules leads to a root cause, a performance problem is determined. Additionally, certain symptoms, if triggered, may also be determined as performance problems. In one embodiment, performance problems associated with response time are determined.

Figure 5:
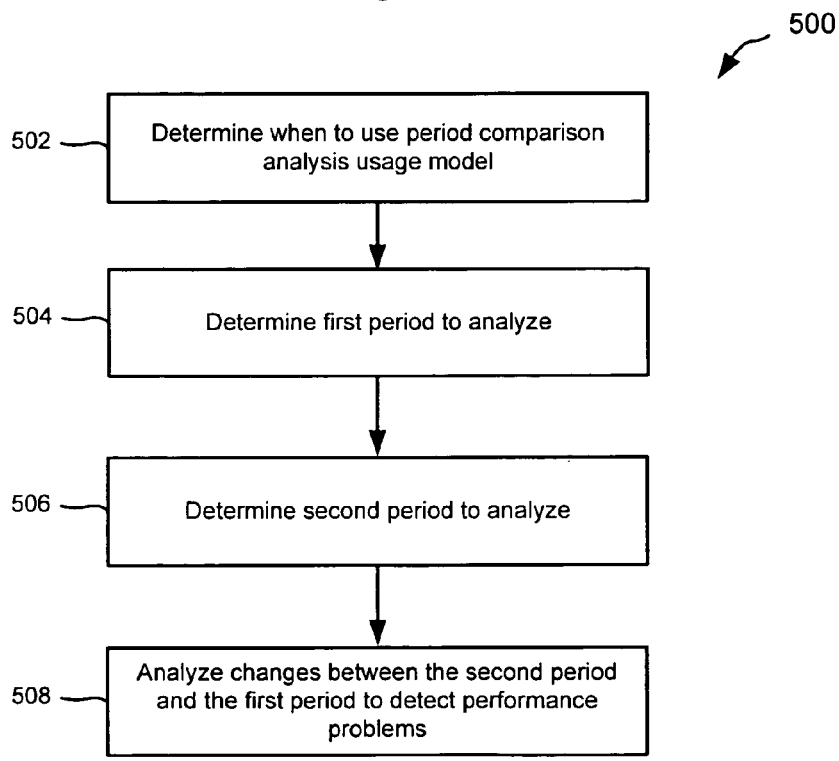
FIG. 5 depicts a simplified flowchart of a method for determining performance problems using a period comparison analysis usage model according to one embodiment of the present invention.

FIG. 5 depicts a simplified flowchart 500 of a method for determining performance problems using a period comparison analysis usage model according to one embodiment of the present invention. In step 502, it is determined when to use the period analysis usage model. For example, the analysis may be run automatically or an input may be received from a DBA to run the analysis.

In one situation, the period comparison usage model may be used when a comparison between two periods is desired. For example, when an upgrade of database software is installed, determining changes to database performance between the new and old version may be desired. The period comparison usage model may be used in this case.

In step 504, a first period for the analysis is determined. Because a comparison is being made between the two periods, the first comparison is determined as a base.

In step 506, a second period for a comparison is determined. The second period may be a period that is used to determine what changes happened between the first period and the second period.

In step 508, the changes between the second period and the first period are analyzed to detect performance problems. For example, the comparison is performed and the changes between database information for the first period and database information for the second period are determined. A set of rules associated with the period comparison analysis usage model is used to analyze the changes. For example, rules may be organized into symptoms may lead to root causes. The comparison information is associated with the rules and it is determined if rules are satisfied for symptoms that lead to root causes. For example, if changes between periods exceed thresholds, performance problems may be determined. If any root causes are determined in the analysis, then this may be considered a performance problem. Also, any symptoms that are determined may also be considered performance problems.

Accordingly, a plurality of usage models are provided for analyzing database activity. The usage models analyze different aspects of database performance. Thus, depending on the situation, different usage models may be more appropriate to use. Also, by providing multiple usage models, different performance problems may be detected by each usage model.

Accordingly, embodiments of the present invention provide many advantages. For example, an objective way of looking at database activity is provided by the different usage models. The models analyze problems found in certain situations uniformly.

Also, by providing different usage models with different rules, different problems may be determined. Different usage models are applicable in different situations that may occur with problems in the database. Thus, when a situation is recognized, an appropriate usage model for the situation is used to analyze the performance of the database. The usage model is then used to determine information to analyze and determines any performance problems associated with the usage model.

Accordingly, a DBA does not need to determine statistics to analyze or attempt to diagnose problems from the statistics. The usage model that is appropriate for the situation can be used to analyze the database information. Also, the analysis performed is uniform and objective because the usage models define which rules are used to analyze the database information.

FIG. 6 is a block diagram of a system 1200 for implementing an embodiment of the invention. System 1200 includes user computers 1205, 1210, and 1215. User computers 1205, 1210, and 1215 can be general purpose personal computers having web browser applications. Alternatively, user computers 1205, 1210, and 1215 can be any other electronic device, such as a thin-client computer, Internet-enabled mobile telephone, or personal digital assistant, capable of displaying and navigating web pages or other types of electronic documents. Although system 1200 is shown with three user computers, any number of user computers can be supported.

A web server 1225 is used to process requests for web pages or other electronic documents from user computers 1205, 1210, and 1215. In an embodiment of the invention, the data analysis software operates within a web browser on a user computer. In this embodiment, all user interaction with the data analysis software is via web pages sent to user computers via the web server 1225.

Web application server 1230 operates the data analysis software. In an embodiment, the web application server 1230 is one or more general purpose computers capable of executing programs or scripts in response to the user computers 1205, 1210 and 1215. The web application can be implemented as one or more scripts or programs written in any programming language, such as Java™, C, or C++, or any scripting language, such as Perl, Python, or TCL.

In an embodiment, the web application server 1230 dynamically creates web pages for displaying the data analysis software. The web pages created by the web application server 1230 are forwarded to the user computers via web server 1225. Similarly, web server 1225 receives web page requests and input data from the user computers 1205, 1210 and 1215, and forwards the web page requests and input data to web application server 1230.

The data analysis application on web application server 1230 processes input data and user computer requests and can be stored or retrieved data from database 1235. Database 1235 stores data created and used by the enterprise. In an embodiment, the database 1235 is a relational database, such as Oracle 9i, that is adapted to store, update, and retrieve data in response to SQL format commands.

An electronic communication network 1220 enables communication between computers 1205, 1210, and 1215, web server 1225, web application server 1230, and database 1235. In an embodiment, network 1220 may further include any form of electrical or optical communication devices, including wireless and wired networks. Network 1230 may also incorporate one or more local-area networks, such as an Ethernet network; wide-area networks, such as the Internet; and virtual networks, such as a virtual private network.

The system 1200 is one example for executing a data analysis software according to an embodiment of the invention. In another embodiment, web application server 1230, web server 1225, and optionally database 1235 can be combined into a single server computer system. In alternate embodiment, all or a portion of the web application functions may be integrated into an application running on each of the user computers. For example, a Java™ or JavaScript™ application on the user computer is used to retrieve or analyze data and display portions of the data analysis application.

Figure 7:
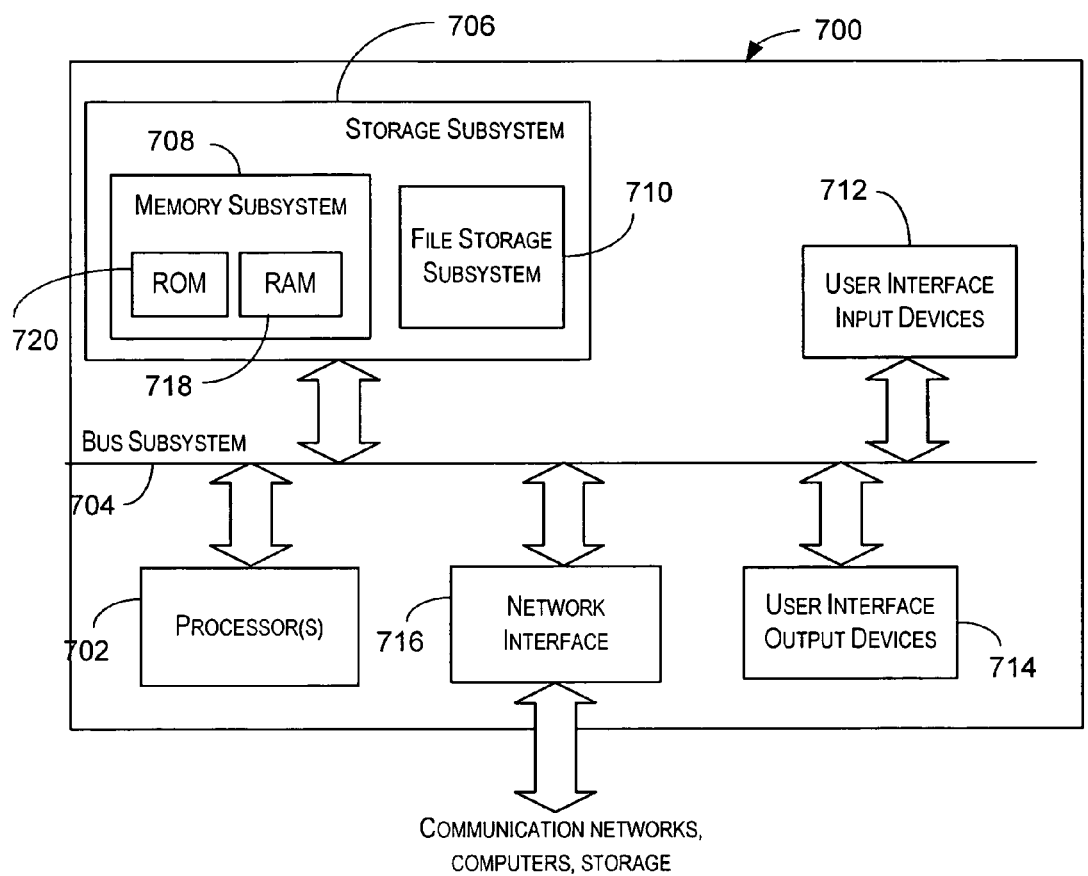
FIG. 7 is a simplified block diagram of a computer system according to an embodiment of the present invention.

FIG. 7 is a simplified block diagram of a computer system 700 according to an embodiment of the present invention. Embodiments of the present invention may be implemented using computer system 700. As shown in FIG. 7, computer system 700 includes at least one processor 702, which communicates with a number of peripheral devices via a bus subsystem 704. These peripheral devices may include a storage subsystem 706, comprising a memory subsystem 708 and a file storage subsystem 710, user interface input devices 712, user interface output devices 714, and a network interface subsystem 716. The input and output devices allow user interaction with computer system 700. A user may be a human user, a device, a process, another computer, or the like. Network interface subsystem 716 provides an interface to other computer systems and communication networks.

Bus subsystem 704 provides a mechanism for letting the various components and subsystems of computer system 700 communicate with each other as intended. The various subsystems and components of computer system 700 need not be at the same physical location but may be distributed at various locations within a network. Although bus subsystem 704 is shown schematically as a single bus, alternative embodiments of the bus subsystem may utilize multiple busses.

User interface input devices 712 may include a remote control, a keyboard, pointing devices, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 700.

User interface output devices 714 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include all possible types of devices and ways to output information from computer system 700. According to an embodiment of the present invention, the interface generated according to the teachings of the present invention may be presented to the user via output devices 714.

Storage subsystem 706 may be configured to store the basic programming and data constructs that provide the functionality of the computer system and of the present invention. For example, according to an embodiment of the present invention, software modules implementing the functionality of the present invention may be stored in storage subsystem 706. These software modules may be executed by processor(s) 702. In a distributed environment, the software modules may be stored on a plurality of computer systems and executed by processors of the plurality of computer systems. Storage subsystem 706 may also provide a repository for storing various databases that may be used by the present invention. Storage subsystem 706 may comprise memory subsystem 708 and file storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. One or more of the drives may be located at remote locations on other connected computers.

Computer system 700 itself can be of varying types including a personal computer, a portable computer, a workstation, a computer terminal, a network computer, a mainframe, a kiosk, a personal digital assistant (PDA), a communication device such as a cell phone, or any other data processing system. Server computers generally have more storage and processing capacity then client systems. Due to the ever-changing nature of computers and networks, the description of computer system 700 depicted in FIG. 7 is intended only as a specific example for purposes of illustrating the preferred embodiment of the computer system. Many other configurations of a computer system are possible having more or fewer components than the computer system depicted in FIG. 7.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
providing a plurality of usage models for analyzing a database system, the plurality of usage models specifying a plurality of rules, each usage model specifying a subset of rules from the plurality of rules, the subset of rules for a usage model specifying a set of one or more performance problems that are analyzed by that usage model;
selecting, by the database system, a first usage model from the plurality of usage models for analyzing the database system, the first usage model specifying a first subset of rules from the plurality of rules to be used for analyzing the database system, wherein the selecting comprises:
- detecting, by the database system, performance information for the database system;
- determining, by the database system, a type of analysis to be performed based upon the detected performance information; and
- determining, by the database system, a usage model to be used corresponding to the type of analysis to be performed;

determining, by the database system, database information corresponding to the first subset of rules;

analyzing the determined database information based upon the first subset of rules;

determining one or more performance problems based upon the analyzing; and outputting information indicative of the determined one or more performance problems.

2. The method of claim 1, wherein the selecting the first usage model comprises:
receiving information indicating that the first usage model is to be used.

3. The method of claim 1, wherein the outputting comprises:
storing information indicative of the determined one or more performance problems for future use.

4. The method of claim 1, wherein:
the plurality of usage models comprises a second usage model configured for analyzing a second set of one or more performance problems that occur in the database system; and
the second set of performance problems is different from a set of performance problems analyzed by the first usage model.

5. The method of claim 1, wherein the first usage model is selected for analyzing a particular set of one or more performance problems.

6. The method of claim 1, wherein the first usage model is a period analysis usage model.

7. The method of claim 6 further comprising determining a period of time for the period analysis usage model and wherein determining the database information comprises determining the database information from the period of time.

8. The method of claim 6, wherein the determined database information comprises information found in one or more snapshots of information.

9. The method of claim 1, wherein the first usage a model is a spot analysis usage model.

10. The method of claim 9 further comprising determining a period of time for the spot analysis usage model and wherein determining the database information comprises determining the database information from the period of time.

11. The method of claim 1, wherein the first usage model is a period comparison usage model.

12. The method of claim 11 further comprising:
determining a first period of time;
determining a second period of time; and
comparing database information in the second period of time with database information in the first period of time.

13. The method of claim 1, wherein selecting the first usage model comprises:
determining when to run the first usage model automatically.

14. A non-transitory computer-readable storage medium storing code for execution by a processor of a computer system, the code comprising:
code for providing a plurality of usage models for analyzing a database system, the plurality of usage models specifying a plurality of rules, each usage model specifying a subset of rules from the plurality of rules, the subset of rules for a usage model specifying a set of one or more performance problems that are analyzed by that usage model;
code for selecting, by the database system, a first usage model from the plurality of usage models for analyzing the database system, the first usage model specifying a first subset of rules from the plurality of rules to be used for analyzing the database system, wherein the code for selecting comprises:
- code for detecting, by the database system, performance information for the database system;
- code for determining, by the database system, a type of analysis to be performed based upon the detected performance information; and
- code for determining, by the database system, a usage model to be used corresponding to the type of analysis to be performed;

code for determining, by the database system, database information corresponding to the first subset of rules;

code for analyzing the determined database information based upon the first subset of rules;

code for determining one or more performance problems based upon the analyzing; and code for outputting information indicative of the determined one or more performance problems.

15. The computer-readable storage medium of claim 14, wherein:
the plurality of usage models comprises a second usage model for analyzing a second set of performance problems that occur in the database system; and
the second set of performance problems is different from a set of performance problems analyzed by the first usage model.

16. The computer-readable storage medium of claim 14, wherein the first usage model is selected for analyzing a particular set of one or more performance problems.

17. The computer-readable storage medium of claim 14, wherein the first usage model is a period analysis usage model.

18. The computer-readable storage medium of claim 17, wherein the code further comprises code for determining a period of time for the period analysis usage model and wherein the code for determining the database information comprises code for determining the database information from the period of time.

19. The computer-readable storage medium of claim 18, wherein the determined database information comprises information found in one or more snapshots of information.

20. The computer-readable storage medium of claim 14, wherein the first usage model is a spot analysis usage model.

21. The computer-readable storage medium of claim 20, wherein the code further comprises code for determining a period of time for the spot analysis usage model and wherein the code for determining the database information comprises code for determining the database information from the period of time.

22. The computer-readable storage medium of claim 14, wherein the first usage model is a period comparison usage model.

23. The computer-readable storage medium of claim 22, wherein the code further comprises:
- code for determining a first period of time;
- code for determining a second period of time; and
- code for comparing database information in the second period of time with database information in the first period of time.

24. The computer-readable storage medium of claim 14, wherein the code for selecting the first usage model comprises:

code for determining when to run the first usage model automatically.

25. The computer-readable storage medium of claim 14, wherein the code for selecting the first usage model comprises:

code for receiving information indicating the first usage model is to be used.

* * * * *

UNITED STATES PATENT AND TRADEMARK OFFICE
CERTIFICATE OF CORRECTION

| | | |
|---|---|---|
| PATENT NO. | : 8,024,301 B2 | Page 1 of 1 |
| APPLICATION NO. | : 10/916695 | |
| DATED | : September 20, 2011 | |
| INVENTOR(S) | : Dias et al. | |

It is certified that error appears in the above-identified patent and that said Letters Patent is hereby corrected as shown below:

In column 11, line 47, in Claim 8, delete "claim 6," and insert -- claim 7, --, therefor.

In column 11, line 50, in Claim 9, after "usage" delete "a".

Signed and Sealed this
Twenty-ninth Day of November, 2011

David J. Kappos
*Director of the United States Patent and Trademark Office*